May 20, 1958
E. VESELIK ET AL
2,835,349
WHEEL BLOCK
Filed May 3, 1955
2 Sheets-Sheet 2
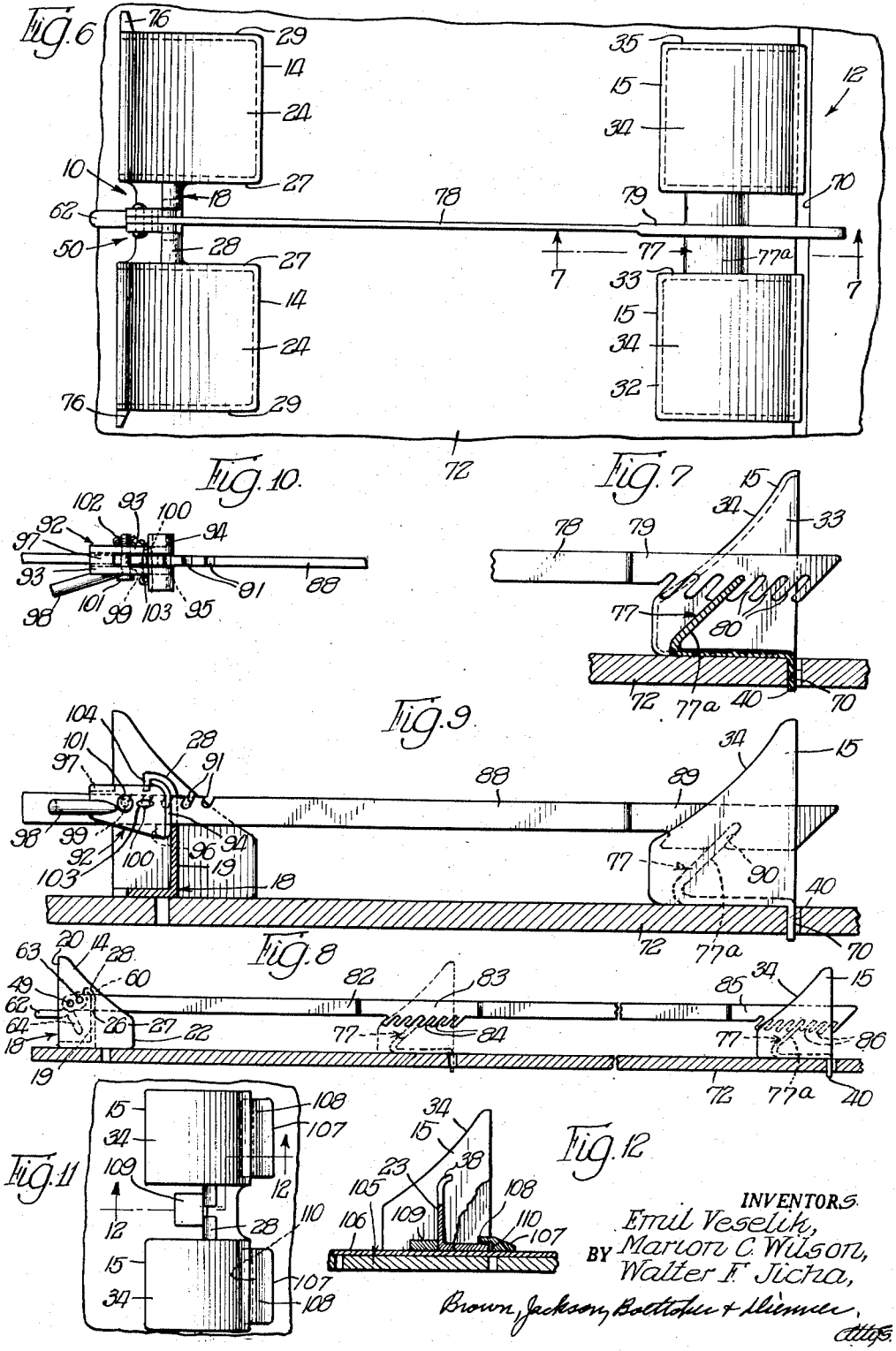
INVENTORS.
Emil Veselik,
BY Marion C. Wilson,
Walter F. Jicha,
Brown, Jackson, Boettcher + Diener
Attys.

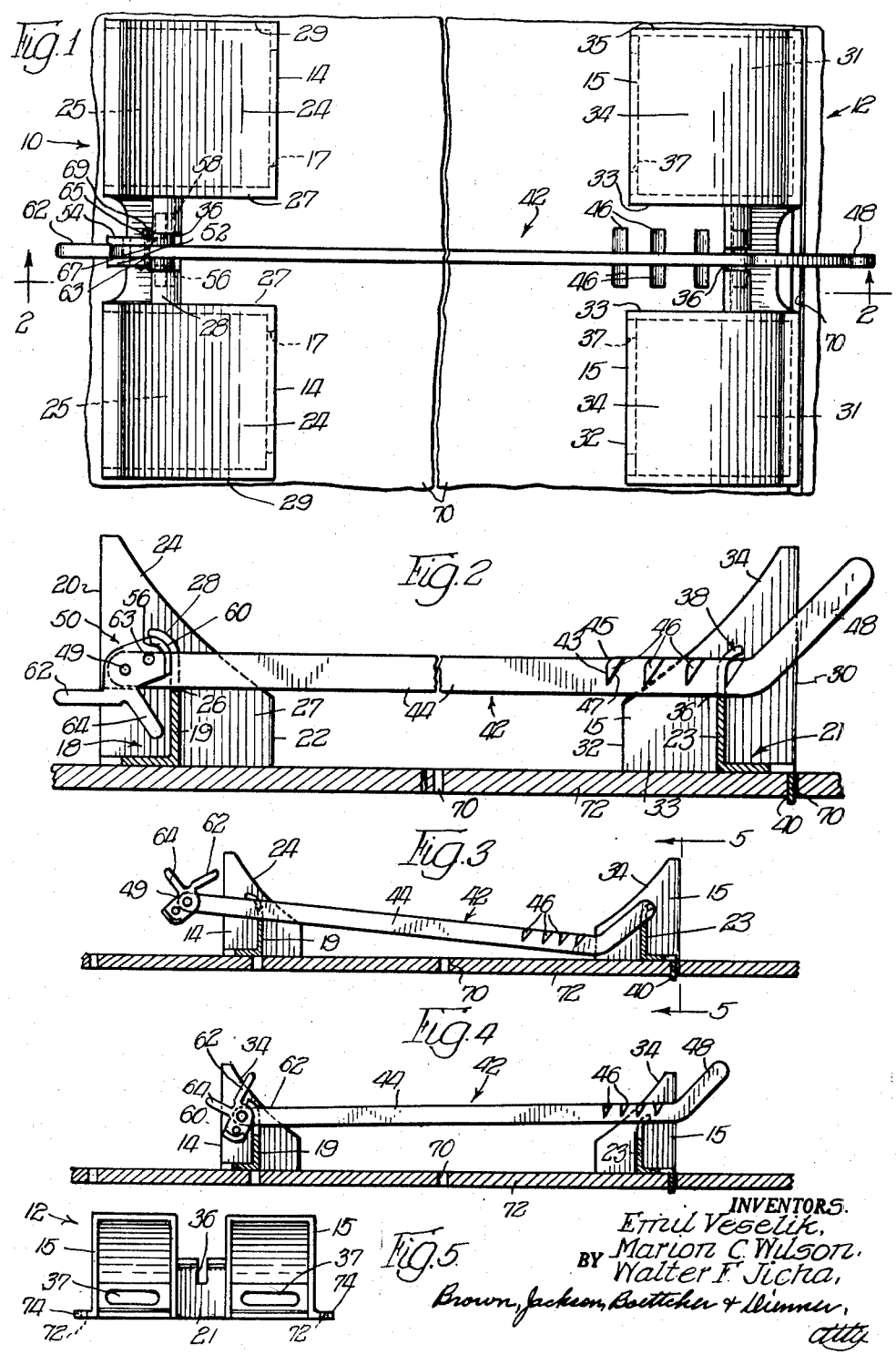

United States Patent Office 2,835,349
Patented May 20, 1958

2,835,349

WHEEL BLOCK

Emil, Veselik, Chicago, Ill., and Marion C. Wilson and Walter F. Jicha, Hammond, Ind., assignors to Calumet Steel Castings Corporation, Hammond, Ind., a corporation of Indiana Application May 3, 1955, Serial No. 505,794

21 Claims. (Cl. 188—32)

The present invention relates to wheel blocks or chocks used to prevent a wheel from rolling either forwardly or rearwardly, and more particularly, the invention relates to wheel blocks or chocks for use in connection with dual tired wheels.

In the past a number of devices have been devised to aid one in preventing vehicle wheels from rolling on a supporting surface, such as a street, the floor of a garage, or the floor of another vehicle, wherein the wheels are held against rolling movement, but may be released when it is desired to move the vehicle. These devices have normally comprised a pair of blocks or chocks for each wheel provided with some type of lever means for drawing the blocks or chocks into tight wedging engagement with the wheel.

In recent times vehicles having dual tired wheels have come to be widely used, and it has been found that the dual tires create special problems when it is desired to use wheel blocks or chocks to hold the vehicle wheels against rolling movement. By using blocks in wedging engagement with one of the tires of a dual tired wheel, movement of the wheel is restrained to a limited extent, but such an arrangement has not proved satisfactory. Where blocks large enough to be wedged against both wheels of the tire are employed, they have proved to be bulky, difficult to handle, and require too much storage space. It has also been found that the lever devices employed in the past to draw the blocks or chocks into engagement with a wheel having a single tire are ineffective when applied to dual tired wheels as the presence of the second tire interferes with the operation of the lever and linkage employed to draw the blocks or chocks against the two tires. This is because the lever and the links of prior devices connecting the wheel blocks together are usually disposed on each side of the wheel to be blocked and consequently the second tire of a duel tired wheel would interfere with the application and operation of these prior devices.

This problem has arisen particularly in connection with transporting vehicles with dual tired wheels in other vehicles. For instance, it has become a common practice to transport truck trailer bodies from place to place by railway flat cars, and the dual tired wheels usually employed on these large trailer bodies render it difficult to adequately restrain the truck trailer bodies from movement during transportation with the wheel blocks or chocks of prior practices.

Accordingly, it is a principal object of the present invention to provide wheel blocks or chocks for use with vehicles having dual tired wheels.

It is a further object of this invention to provide wheel blocks or chocks for use with vehicles having dual tired wheels which are especially adapted for restraining movement of such vehicles when transported on railway flat cars and other types of transport vehicles.

It is another object of the invention to provide an efficient device for tightly wedging the wheel blocks or chocks against a dual tired wheel.

It is yet another object of the invention to provide wheel blocks for dual tired wheels which comprise few and simple parts, which may be easily handled, and readily stored when not in use.

We provide a wheel block or chock for securing a dual tired wheel in place on a supporting surface comprising a pair of blocks or chocks for engaging under the front portion of the wheel, a pair of blocks for engaging under the rear portion of the wheel, and an elongated rigid member comprising a lock bar which is extendable between the pairs of blocks and passes between the tires of the wheel. One of the pairs of blocks has depending flanges associated therewith, which are adapted to be inserted in a slot in the railway flat car or the like, such as the groove or space between the floor boards of the flat car. Where slots in the floor are not available, the blocks may be formed with other means by which they may be secured to the floor of the railway car. An upstanding flange is fixed between and connected to the blocks of each pair of blocks and a vertical slot is formed in each flange at the upper edges thereof, with outwardly facing bearing surfaces being formed at the upper edges of the flanges on each side of the slots as by curving slightly outwardly the upper edge of the flanges.

In one form of our invention the elongated rigid member carries lugs on one end thereof for engaging the bearing surfaces of one pair of said pairs of blocks and an eccentrically mounted cam surface on the other end thereof for engagement with the bearing surfaces of the other of said pairs of blocks, and means is provided for actuating the eccentrically mounted cam surface for securing the pairs of blocks in tight wedging engagement with the tires of the wheel. We also provide an angled guide arm on the end of the rigid member carrying the lugs to aid in positioning the lugs in their proper position with respect to the bearing surfaces which they are to engage. We have also found it convenient to provide means for locking the eccentrically mounted cam surface in wheel securing position in such a manner that it will not be jarred loose during transportation of the vehicle which has the dual tired wheels.

From the foregoing, it will be obvious that the present invention provides substantial advantages over prior practices. For example, not only are both tires of the wheel wedgingly engaged by the respective pairs of blocks, but a portion of the wheel blocks or chocks is lodged in an opening or slot in the supporting surface so as to prohibit sliding or rolling of the wheel due to movement of the supporting surface, as in the case of a railway flat car.

In addition to the foregoing, it is an object of the present invention to provide wheel blocks or chocks for dual tired wheels which are economical of manufacture, convenient in use, capable of ready attachment to and detachment from dual tired wheels, and are capable of use in connection with various sizes and types of dual tired wheels.

A further object of our invention is to provide a wheel block assembly readily adaptable for use with trucks or vehicles having a single rear axle with dual tired wheels, one pair of rear wheels at each side, or with trucks or vehicles having dual rear axles with dual tired wheels, two pairs of rear wheels at each side. It is also an object of our invention to provide improved means for anchoring to a steel faced deck of a flat car or the like one of two opposed pairs of blocks in such manner that the anchored pair of blocks may readily be removed and replaced as required.

Other objects and advantages of the present invention will become apparent in the following description of a preferred embodiment of the wheel blocks or chocks of the present invention, and the preferred use thereof.

Now, in order to acquaint those skilled in the art with the present invention and with a manner of making and using the wheel blocks or chocks of the invention, we shall describe, in connection with the accompanying drawing, a preferred embodiment of the wheel block or chock.

In the drawings:

Figure 1 is a plan view of one embodiment of the invention, showing the locking bar in locked position;

Figure 2 is a cross sectional view along line 2—2 of Figure 1;

Figure 3 is a view similar to Figure 2, but on a somewhat smaller scale showing the locking bar as it would be passed between the tires of a dual tired wheel toward one pair of the pairs of wheel blocks to position the locking bar for wedging the wheel blocks under the tires;

Figure 4 is a view similar to that of Figure 3, but showing the locking bar in a different position;

Figure 5 is an end view of one of the pairs of blocks along line 5—5 of Figure 3 but with modified means for securing the blocks relative to the floor of a car;

Figure 6 is a view similar to Figure 1 but showing a second and preferred form of the block assembly of our invention;

Figure 7 is a sectional view taken substantially on line 7—7 of Figure 6;

Figure 8 is a view similar to Figure 2 but showing a third modification of the block assembly of our invention;

Figure 9 is a view similar to Figure 2 but showing a fourth modification of the block assembly of our invention;

Figure 10 is a plan view of the cam means and the draw bar of Figure 9, the draw bar being shown fragmentarily;

Figure 11 is a plan view of the anchored pair of the two pairs of blocks of Figure 1 showing a fifth modification of the block assembly of our invention comprising modified means for anchoring the blocks of that pair to the steel clad deck of a flat car or the like; and Figure 12 is a sectional view taken substantially on line 12—12 of Figure 11.

This application is a continuation-in-part of our co-pending application Serial No. 412,148 for Wheel Block, filed February 24, 1954, now abandoned.

One embodiment of our invention comprises two pairs of steel wheel blocks or chocks 10 and 12 (hereinafter frequently referred to as "blocks") which we prefer to form in units by a casting operation. Materials other than steel may be employed, but we have found cast steel very satisfactory for the purposes for which the blocks of the present invention are intended. The pair of blocks 10 comprises two block members 14, which are preferably hollow to conserve steel and reduce the weight thereof, connected together by an intervening angle shaped member 18. The block members 14 are identical in shape and size, and may be approximately square in cross-section at their bases. They each have a comparatively high front side 20 and a comparatively short rear side 22, and a curvilinear upper surface 24 having a radius of curvature approximately equal to the radius of the tires on the wheels in connection with which they are to be employed. Sides 20 and 22 may be open if so desired to further reduce the overall weight of the blocks and to conserve steel. As shown in Figure 1, however, sides 22 are preferably not completely open, but have a slot 17 formed in each, to provide a hand hold to assist in handling the blocks. These slots are similar to slots 37 of the pair of blocks 12 shown more particularly in Figure 5. Each block 14 thus comprises a bottom wall 25, side walls 27 and 29 and a slotted rear wall 22 joined integrally with the bottom wall 25, side walls 27 and 29, and the curved bearing surface 24. Angle member 18 rigidly joins the blocks 14 together in spaced apart relationship, and the blocks 14 are spaced apart sufficiently so that the separate blocks will engage the respective tires of a dual tired wheel. Preferably, angle member 18 is spaced somewhat inwardly from the sides 20 to provide a space which is protected on either side by the presence of the block members 14. This space is occupied by the hereinafter described cam lever means. Wall or flange 19 of member 18 is formed with a slot 26 centrally located in the upper edge thereof, and the upper edge of the wall or flange is curved outwardly as shown at 28.

The pair of blocks 12 comprise two block members 15 which are similar in shape to block members 14 and have comparatively high rear sides 30, comparatively short front sides 32 and upper surfaces 34 having a radius of curvature approximately equal to the radius of the tires on the wheels in connection with which they are to be employed. As in the case of blocks 14, sides 30 are open and sides 32 are formed with slot 37 to provide a hand hold as in the case of slot 17 of pair of blocks 10. Each block 15 comprises a bottom wall 31, side walls 33 and 35 and slotted front sides 32 joined integrally with bottom wall 31 and the curved bearing surface 34. Angle member 21, similar to the angle member 18, rigidly joins the blocks 15 together in spaced apart relationship, spacing the blocks 15 apart a distance equal to distance that intervenes between the blocks 14. As in the case of the pair of blocks 10, the angle member 21 is spaced inwardly somewhat from the sides 30 thereof. Wall or flange 23 of angle member 21 is also formed with a groove or notch 36 centrally located in the upper edge thereof, and the upper edge of the wall or flange is curved outwardly as shown at 38. Block members 15 differ from block members 14 in the illustrated embodiment by having depending flanges 40 formed thereon which extend somewhat below the lower surfaces of walls 31 of the block members. The purpose of these flanges 40 will hereinafter be made clear. Additionally, slot 26 is made somewhat wider than slot 36 for a purpose hereinafter made clear.

The pairs of blocks 10 and 12 are secured to the wheel in tight wedging relationship therewith by means of the elongated rigid member or lock bar 42. Member 42 comprises an elongate rectilinear member 44 carrying at one end thereof a series of laterally projecting lugs 46 and an angled guide arm 48. Preferably, lugs 46 are spaced apart a distance sufficient to allow the upper edge of the flange 23 to be inserted between them, and an equal number of the lugs are provided on each side of the member 44. The lugs have a rectilinear surface 43 merging into a curved surface 45 and an inclined, rectilinear surface 47, with the surfaces 43 and 45 being similar in configuration, respectively, to the outer surface on the upper portion 38 of flange 23 against which they are adapted to bear. The other end of member 44 carries a bifurcated member 50 pivotally mounted at 49 and having arms 52 and 54 which are provided with normally disposed flanges 56 and 58. The latter flanges have a configuration similar to the configuration of the outwardly facing surface of the upper portion 28 of the flange 19. The outer surfaces of the flanges 56 and 58 are adapted to bear against the outwardly facing surface of flange 19 and they constitute cam surfaces 60. It is to be noted that the surfaces 60 comprise a curvilinear leading edge and a rectilinear trailing edge.

Bifurcated member 50 also comprises two stub arms 62 and 64 which preferably are at an angle of approximately 120 degrees with respect to each other and the arms 62 and 64 may be the same size, or, as shown, arm 62 may be somewhat longer than arm 64. Aligned holes 63 and 65 are formed in arms 52 and 54 and, when the member 50 is in the position shown in Figure 2, that is, the block wedging position, the holes 63 and 65 are adapted to be aligned with hole 67 formed in member 44 to receive cotter pin 69 or the like to prevent accidental movement of member 50 with respect to member 44.

By way of example, the blocks described above may be used by first positioning a pair of blocks 12 at one end of, and on the floor of, a railway flat car or the like so that the depending flanges 40 are disposed in a space 70 normally existing between the boards 72 of the railway flat car. Manifestly, such a space could readily be provided in a car floor or in other supporting surfaces where a space such as space 70 does not exist. Moreover, while in the preferred embodiment we have designed the flanges 40 to take advantage of, for instance, spaces 70 normally existing between the boards comprising the flooring of a railway car or the like, it is obvious that the flanges 40 could be eliminated if so desired and the blocks or chocks secured to the floor of the car or the like by bolts or a similar securing means passing through apertures 73 in side flanges 74 (see Figure 5) of the respective blocks. The vehicle to be transported, for instance, a wheeled body commonly known as a semi-trailer which normally has dual tired wheels, is backed (by a tractor or the like) until the rear side of one of its wheels firmly contacts the surfaces 34 of blocks 15; the vehicle is then squared or aligned with the railway flat car.

The pair of blocks 10 may then be put into place under the forward portion of the wheel and should be positioned so that the surfaces 24 of blocks 14 will be aligned with the tires of the wheel. Preferably, the surfaces 24 of blocks 14 are spaced somewhat from the tires at this point in the positioning of the blocks to permit easier positioning of lugs 46 with respect to flange 23. The elongated rigid member or lock bar 42 is then passed rearwardly from the blocks 14, guided by slot 26 in flange 19, and into the space between the tires of the wheel, with angled guide arm 48 projecting upwardly as shown in Figure 3. As the end of the guide bar approaches flange 23 of angle member 21, the end of the angled guide arm 48 is positioned approximately in the middle of the space separating blocks 15, and upon being pushed further rearwardly, the end of angled guide arm 48 will enter groove 36. This is the position shown in Figure 3, and this properly locates the member 42 with respect to the pair of blocks 12. By further pushing the member 42 rearwardly, the end of the member carrying lugs 46 will ride upwardly in the groove 36, and as the pairs of lugs 46 engage the upper edge of the flange 23, they will ride over the top of it. It should be noted that since the rear surfaces 47 of the lugs are inclined, they facilitate this positioning of the member 42, since the upper edge of surfaces 47 will contact the rounded shoulder of portion 38 and enable the operator to easily push the lugs over the upper edge of flange 23. When the end of member 42 has been pushed rearwardly to the point that cam surfaces 60 of bifurcated member 50 are positioned as shown in Figure 4, that is, with the leading edge of the curvilinear surface adjacent to, or against, the outwardly facing surface of flange 19, the upper edge of the flange 23 is allowed to enter through the nearest spaces between the paired lugs 46 so that the lowermost edge of the member 44 will rest on the bottom of groove 36. Slot 26 is made sufficiently wide so that a portion of the bifurcated member 50 may enter it in this positioning operation, though reference to Figure 1 will disclose that flanges 56 and 58 are too wide to pass through the slot and, consequently, abut the outwardly facing surfaces of flange 19.

Alternatively, the positions of pairs of blocks 10 and 12 may be reversed so that the pair of blocks 10 is placed at the rear of the wheel and the pair of blocks 12 is positioned on the forward side of the wheel with its flanges 40 disposed in the nearest space 70. The lock bar 42 may be applied in the same manner as described above, or, after the pair of blocks 12 is positioned with the tires thereagainst, the lock bar may then be passed between the tires before the pair of blocks 12 is put into position. After the lugs 46 are pushed forwardly as far as possible, the end of the rod carrying them is lifted upwardly, the pair of blocks 12 is positioned, and the rod lowered to place the appropriate pair of lugs in position against the bearing surfaces of flange 23.

When the lock bar 42 has been correctly positioned, a short length of pipe is then fitted over stub arm 64 and the pipe is moved in the direction of the arrow shown in Figure 4 in order to pivot member 50 with respect to member 44 and to bring the curvilinear portions of the cam surfaces 60 into engagement with the outer surface of the upper edge of upstanding flange 19. When the arm 64 has been pushed down until the arm 62 is projecting outwardly toward the operator, a second short length of pipe is fitted over arm 62, the first short length of pipe is removed and the surfaces 60 moved by the second short length of pipe to the locked position shown in Figure 2. The outwardly directed, concave surfaces of the flanges 19 and 23 therefore comprise bearing surfaces, and the surfaces 43, 45 and 60 bear against them, respectively. It is important that the arm 62 be positioned on member 50 in such a position that it projects outwardly horizontally in the locked position so that the short length of pipe fitted thereover may be withdrawn. The arm 64 is shown somewhat shorter than arm 62 in the illustrated embodiment so that the first short length of pipe may be withdrawn though the arm 64 inclines downwardly. It is to be noted that most of the load bearing portion of surface 60 lies above the "dead center" line extending from pivot point 49 to approximately the center of the lugs 46 in contact with flange 23. Therefore, once the member 50 is in the position shown in Figure 2, it remains there until surface 60 is moved to the other side of the said "dead center" line. However, where the invention is used in flat cars and the like, we prefer to insert cotter pin 69 through aligned holes 63, 65 and 67 to insure that blocks remain in wedging relationship with the wheel tires even when the flat car or the like travels over rough road beds. It is also to be noted that member 50, when in the position shown in Figure 2, is protected on three sides from accidental contact which would cause release of the wheel blocks.

It has been found that the above described wheel blocks efficiently hold dual tired wheels of a semi-trailer or the like from undesired rolling movement when applied as aforedescribed. Since tire and wheel sizes of trailers and other vehicles are not uniform, the plurality of pairs of lugs 46 have been provided to allow the blocks to be applied to a wide variety of sizes of wheels and tires with equal facility. It has also been found that the blocks comprising the invention may be readily removed from the wheels to which they are applied and that their relatively small size facilitates storage thereof. Thus, upon removal from trailer wheels the pairs of blocks may be stacked lengthwise along the side of a compartment, and not occupy any more space than the depth of the individual blocks.

We also contemplate that the grooves 26 and 36 of pairs of blocks 10 and 12, respectively, may be made the same size so that the position of lock bar 42 may be reversed from that shown in the drawings whereby cam surfaces 60 of bifurcated member 50 cooperate with flange 23 rather than flange 19. This may be accomplished by widening the groove 36 and lengthening the lugs 46, if necessary.

In the modification shown in Figures 6 and 7, which is the preferred form of our invention, the block assembly is, in general, the same as in Figures 1 to 4, inclusive, and the same reference numbers have been used for the same elements, distinguishing reference numbers being used for elements of Figures 6 and 7 which are additional to, or different from, the form of Figures 1 to 4. Referring to Figures 6 and 7, each of the blocks 14 of the pair 10 of movable blocks is provided, at the outer side and the rear thereof with an outwardly projecting knock-out lug 76. The lugs 76 are readily accessible and may be struck with a hammer or other suitable tool to loosen the blocks for withdrawal thereof from beneath the wheel, when required. The blocks 15 of the anchored pair 12 of blocks are connected by an angle member 77 upwardly and outwardly inclined web element 77a integral therewith, which replaces the angle member 21 of Figures 1 to 4, inclusive. A lock or draw bar 78 extends between the two pairs of blocks and is provided at one end with cam member 50 cooperating with angle member 18 of blocks 14 of the pair 10 of blocks in the manner previously described. The other end portion of bar is thickened and of increased width, at 79, and is provided with a series of slots 80 extending from its lower edge and inclined upwardly and outward similarly to web element 77a. The slots 80 are selectively engageable with web element 77a for adjusting the effective length of draw bar 78 in order that the blocks may be moved into tight contact with the tires of the wheel by the cam means 50, in the manner previously described.

The modified form of assembly shown in Figure 8 is readily adaptable for use with either a single pair of wheels, as above, or with two pairs of wheels, as in a truck or vehicle having dual rear axles with two pairs of rear wheels at each side of the truck body and spaced apart lengthwise thereof. The assembly of Figure 8 is the same as that of Figures 6 and 7, with the exception that a relatively long draw bar 82 is provided. Bar 82 is provided at one end with cam means 50, as before. The midportion 83 of bar 82 is thickened and of increased width and is provided with a series of slots 84 extending from its lower edge at an upward and outward inclination similar to that of web element 77. Likewise, the other end portion 85 of draw bar 82 is thickened and of increased width and is provided with a series of slots 86 extending from its lower edge at an upward and outward inclination similar to that of web element 77. When the assembly is used for one pair of wheels, one of the slots 84 at the midportion 83 of draw bar 82 is engaged over web element 77. The two pairs of blocks are then properly space for engagement with the wheels of one pair at the front and the rear thereof, in the manner above described, the slotted midportion 83 of draw bar 82 being appropriately disposed to that end. In order to use the assembly for two pairs of wheels, one of the slots 86 in the end portion 85 of draw bar 82 is engaged over web element 77. The two pairs of blocks are then so spaced that one pair thereof engages in back of one pair of wheels and the other pair of blocks engages in front of the other pair of wheels, the draw bar 82 being, of course, of proper length to assure that result. When the assembly of Figure 8 is used for but one pair of wheels, the portion of draw bar 82 extending outwardly beyond the anchored pair of blocks preferably is disposed beneath the body of the truck so as to be shielded thereby, the remaining portion of the draw bar being disposed between and guarded by the blocks and the wheels. When the assembly of Figure 8 is used with two pairs of wheels, the draw bar 82, for the major portion of its length, extends between and is effectively guarded by the blocks and the wheels.

The modified form of assembly shown in Figure 9 is similar to that of Figures 6 and 7, except as to the draw bar and the cam means. The draw bar 88 is provided at one end with an element 89 of increased thickness and width having a slot 90 extending from its lower edge inclined similarly to and engaging over web element 77 of the anchored pair of blocks. The draw bar is provided at its other end portion with a series of uniformly spaced slots 91 of suitable size and shape, extending from the upper edge of draw bar 88 thereto. A cam member 92, generally similar to cam 50 of Figures 1 to 4, inclusive, straddles draw bar 88. The cam member 92 comprises two side plates 93 disposed adjacent the sides of draw bar 88 and connected together at their inner ends by a cam flange 94 which is slotted at 95 from its upper end for reception of draw bar 88. The lower inner corners of plates 93 are connected by a boss 96 at the lower end of slot 95 and the upper outer corners of plates 93 are connected by a web element 97. A handle 98 extends from the outer portion of one of the plates 93 at an outward inclination thereto, to which it is fixedly secured in a suitable manner, conveniently by being formed integrally therewith. The plates 93 are provided at their upper portions with two pairs of aligned openings 99 and 100. The pairs of openings 99 and 100 are spaced correspondingly to the slots 91 in draw bar 88. The pair of openings 99 receive a headed pivot pin 101 retained therein by a cotter pin 102 and engaging in one of the slots 91 extending from the upper edge of draw bar 88. The slots 91 are shown as straight and inclined for retention of the pin 101, though they may be otherwise formed and disposed to that end. The openings 100 receive a cotter pin 103, which pin 103 engages in the slot 91 next adjacent pin 101. The flange 19 of angle member 18 connecting the blocks 14 is provided, at each side of slot 26, with a flange or lip 104 extending downward from the upper curved edge 28 thereof and spaced outward from wall or flange 19 substantially parallel therewith. The lips 104 function as retaining elements and, in conjunction with wall 19 of member 18, effectively guard against disengagement of cam member 50 from wall 19 during transit due to vertical movement or bouncing of the vehicle wheels.

In using the assembly of Figures 9 and 10, the wheels to be anchored are first positioned against the anchored pair of blocks. The blocks of the other pair are then positioned against the tires of the wheels at opposite sides thereof from the anchored blocks. The slotted end of draw bar 88 is then hooked over web element 77 of the first or anchored pair of blocks and is inserted through the slot in the angle member 18 of the other and adjustable pair of blocks, after withdrawing locking pin 103 and swinging cam member 92 downward about pivot pin 101 to inoperative position. The cam member 92 is then raised sufficiently to disengage pivot pin 101 from draw bar 88 and is moved along the latter toward angle member 18 into cooperating relation thereto. When cam member 92 is properly positioned lengthwise of the bar 88, pivot pin 101 is engaged into the appropriate slot 91 of bar 88 and cam member is swung upward about pivot pin 101 into engagement with angle member 18, effective for forcing the corresponding blocks into tight contact with the wheels. That operation may be repeated, if necessary, until the adjustable blocks have been moved into tight contact with the wheels. When that has been done, the locking pin 103 is replaced and, in cooperation with boss 96, effectively locks cam member 92 in operative position. In order to release the wheels, the locking pin 103 is withdrawn, cam member 92 is swung downward to releasing position and is slid along bar 88 to a position permitting withdrawal of the adjustable blocks, which are then withdrawn from beneath the wheels.

Flat cars having steel faced decks are frequently used for shipping trucks and other wheeled vehicles the wheels of which should be effectively anchored during shipment. In Figures 11 and 12 we have shown means whereby a pair of blocks embodying our invention may be anchored to a steel deck with expedition and efficiency and may be as readily removed. The blocks shown are the same as the right hand pair of blocks 15 shown in Figures 2 to 4, inclusive, except that the flanges 40 have been omitted, and require no detailed description here. Referring to Figures 11 and 12, we have shown fragmentarily and in section the deck 105 of a railway flat car having a steel facing 106. A pair of steel anchor plates 107 are welded to the deck facing 106. Each of the plates 107 is undercut or rabbetted at its inner portion to provide a lengthwise flange 108 spaced from deck facing 106 a distance slightly greater than the thickness of the bottom wall 31 of the respective blocks 15. A steel bar 109, rectangular in plan and of substantial thickness, is welded to deck facing 106 midway between and parallel with plates 107. The bar 109 is spaced from a line connecting shoulders 110 of plates 107, extending downward from flanges 108 thereof, a distance slightly greater than the distance from the rear or outer edge of bottom wall 31 of the respective blocks 15 to the front or inner edge of the base flange of the angle member 21, and is of a length to contact the straight portion of such inner edge of the base flange of angle member 21. By tilting the pair of blocks 15 slightly, it may be positioned between the plates 107 and the bar 109, as shown. The blocks 15 are then effectively anchored in position by plates 107 and bar 109 and are restrained thereby against transverse movement during securing of the two pairs of blocks about the wheels in the manner previously described, and the block assembly is effectively anchored to the deck 105 of the car during transit of the vehicle being shipped. When the two pairs of blocks are released and the vehicle is removed, the pair of blocks may readily be removed by tilting it sufficiently to clear bar 109 and withdrawing the bottom walls 31 from beneath flanges 108 of plates 107.

The foregoing description and the drawings is given merely to explain and illustrate our invention, and the invention is not to be limited thereto, except insofar as the appended claims are so limited, since those skilled in the art who have our disclosure before them will be able to make modifications and variations therein without departing from the scope of the invention.

We claim:

1. A wheel chock for dual tired wheels comprising a pair of blocks for engaging under the front portion of the pair of tires, a pair of blocks for engaging under the rear portion of the pair of tires, an upstanding flange fixed between the blocks of each pair of blocks, a vertical slot formed in each flange at the upper edge thereof, said flanges each having an outwardly facing bearing surface adjacent the said slots, and an elongate rigid member extending between said pairs of blocks and receivable in said slots, said member being adapted to pass between the tires of the wheel and carrying at least one lug at one end thereof for engaging said bearing surface of one of said pairs of blocks and a movable cam surface at the other end of said member for engaging said bearing surface of the other of said pairs of blocks, and means for actuating said cam surface for securing said pairs of blocks in tight wedging engagement with the tires of the wheel.

2. A wheel chock for dual tired wheels comprising a pair of blocks for engaging under the front portion of the tires, a pair of blocks for engaging under the rear portion of the tires, an upstanding flange fixed between the blocks of each pair of blocks, a vertical slot formed in each flange at the upper edge thereof, said flanges having outwardly facing bearing surfaces on each side of said slots, and an elongated rigid member extending between said pairs of blocks and receivable in said slots, said member being adapted to pass between the tires of the wheel and carrying lugs at one end thereof for engaging said bearing surfaces of one of the pairs of blocks and an eccentrically mounted surface at the other end thereof for engaging said bearing surfaces of the other of said pairs of blocks, said one end of said member carrying an angled guide arm for aiding in positioning of said lugs with respect to the bearing surfaces of said one of said pairs of blocks, and means for actuating said eccentrically mounted surface for securing said pairs of blocks in tight wedging engagement with the tires of the wheel.

3. A wheel chock for securing dual tired wheels in place on a supporting surface comprising a pair of blocks for engaging under the front portion of the tires, a pair of blocks for engaging under the rear portion of the tires, means associated with one of the pairs of blocks and adapted to prevent movement of the pair of blocks along said surface, an upstanding flange fixed between the blocks of each pair of blocks, a vertical slot formed in each flange at the upper edges thereof, said upper edges being curved outwardly and providing bearing surfaces, an elongated rigid member extending between said pairs of blocks and adapted to be disposed in said flange slots, said member being adapted to pass between the tires of the wheel and carrying at least one lug at one end thereof for engaging the bearing surface of one pair of said pairs of blocks and a movable cam surface at the other end thereof for engaging the bearing surface of the other of said pairs of blocks, said one end of said member further carrying an upwardly angled guide arm for aiding in positioning of said lugs with respect to the bearing surfaces of said one of said pairs of blocks, said guide arm being adapted to be inserted in the slot formed in the flange fixed between said one pair of said pairs of blocks, means for actuating said cam surface for securing said pairs of blocks in tight wedging engagement with the tires of the wheel, and means for locking said eccentrically mounted surface in wheel securing position.

4. A wheel chock for dual tired wheels comprising a pair of blocks for engaging under the front portion of the pair of tires, a pair of blocks for engaging under the rear portion of the pair of tires, a generally upstanding flange fixed between and connecting the blocks of each pair of blocks, an elongate rigid member extending between said flanges between the tires of the wheel, one of said flanges and one end of said member having cooperable engaging portions detachably to connect said member to said one flange, the other of said flanges having a vertical slot therein and an outwardly facing bearing surface adjacent the slot, the other end of said member being removably received in said slot, a movable cam surface on said other end of said member cooperable with said bearing surface on said other flange, and means for actuating said cam surface for detachably securing said pair of blocks in tight wedging engagement with the tires of the wheel.

5. A wheel chock as set forth in claim 4, wherein said other flange includes an outwardly curved upper portion, said slot being formed in said curved portion and the outward surface of said curved portion comprising said bearing surface, said cam surface comprising a surface eccentrically mounted for rotation on said other end of said member for engagement with the bearing surface of said curved portion of said other flange.

6. A wheel chock as set forth in claim 4, wherein the means for actuating the movable cam surface comprises a pair of arms angularly related to one another and connected to said cam surface, said cam surface and said arms being pivotally mounted on said other end of said elongate rigid member.

7. In combination, a pair of blocks for engaging under the front portion of the dual tired wheel, a pair of blocks for engaging under the rear portion of the wheel, a generally vertical flange extending between and connecting the blocks of each pair of blocks in fixed spaced relationship, each of said flanges having its upper end curved away from the wheel of the respective block and vertically slotted, said flanges providing bearing surfaces between the pairs of blocks, an elongate rigid member extending between said pairs of blocks, said member being adapted to pass between the tires of the wheel and carrying lugs at one end thereof for engaging the bearing surface between one of said pairs of blocks and a movable cam surface at the other end thereof for engaging the bearing surface between the other of said pairs of blocks, and means for actuating said cam surface for securing said pairs of blocks in tight wedging engagement with the tires of the wheel.

8. The combination of claim 7 wherein the lugs on said one end of the elongated rigid member have an inclined surface adapted to assist said member in riding over the curved upper end of the vertical flange and into engaged position with the bearing surface of said vertical flange, the surfaces of said lugs opposite from the inclined surfaces of the lugs being of a shape corresponding to the bearing surface of said vertical flange.

9. The combination of claim 7 wherein the movable cam surface of the elongated rigid member comprises a bifurcated member pivotally mounted on the rigid member with laterally extending flanges for engaging the bearing surface of the flange between said other of said pairs of blocks on each side of the vertical slot in said flange, said laterally extending flanges having surfaces corresponding to the bearing surface of the vertical flange.

10. The combination of claim 9 together with locking means for retaining the movable cam surface in position for maintaining the pairs of blocks in tight wedging engagement with the tires, said locking means and movable cam surface being sheltered against accidental displacement by being disposed between the pair of blocks.

11. A wheel chock for securing a wheel in place on a supporting surface comprising blocks for engaging under the front and rear portions of a wheel, an elongate rigid member extending between said blocks and connected adjacent one end thereof with one of said blocks, the other of said blocks including a generally upright flange having an outwardly curved upper portion, said curved upper portion of said flange having a vertical slot therein, said rigid member being received adjacent the other end thereof in said slot, a movable cam surface mounted adjacent said other end of said rigid member engageable with the outer surface of said curved portion of said other block, and means for actuating said cam surface to secure said blocks in tight wedging engagement with the wheel.

12. The chock assembly of claim 4 wherein the elongate rigid member is provided at the one end portion thereof with a series of downwardly opening slots selectively engageable with said flange of the corresponding pair of blocks.

13. The chock assembly of claim 4 wherein the elongate rigid member is of a length to space the pairs of blocks a distance to accommodate between them two pairs of wheels of a vehicle having dual rear axles and is provided at its midportion and at its one end portion with a series of downwardly opening slots selectively engageable with said flange of the pair of blocks remote from said cam means.

14. A wheel chock assembly for dual tired wheels comprising two opposed pairs of blocks for engaging under the front and the rear portions of the wheels, the blocks of each pair being spaced apart and rigidly connected together by a connecting element extending therebetween, a draw bar extending between said connecting elements and detachably secured to the connecting element of one pair of blocks, cam means carried by said draw bar adjustable lengthwise thereof, said cam means and draw bar having cooperating means securing said cam means in adjusted position on said draw bar, and cooperating means carried by said cam means and said connecting element of the other pair of blocks for forcing the latter toward said one pair of blocks.

15. In anchoring means for wheel chock blocks for dual tired wheels, a pair of blocks spaced apart and connected together by an angle member extending therebetween, said blocks having a bottom wall and said angle member having a base flange, a supporting deck having a metal facing, two anchor plates welded to said facing and provided at one side with a flange spaced from said deck facing, and an anchor bar welded to said deck facing parallel with the flanges of said plates and midway therebetween, said pair of blocks being disposed with the rear edge portions of their bottom walls underlying said flanges and the forward edge of the base flange in close proximity to said bar.

16. A wheel chock as set forth in claim 4 wherein said other flange includes an outwardly curved upper portion and lips extending downwardly from said curved upper portion in substantially parallel spaced relation to said other flange, said slot being formed in said curved portion and the outward surface of said curved portion comprising said bearing surface, said cam surface comprising a surface eccentrically mounted for rotation on said other end of said member for engagement with the bearing surface of said curved portion of said other flange and said lips limiting turning of said cam surface in camming direction.

17. A wheel chock comprising blocks for engaging under the front and rear portions of a wheel, an elongate rigid member extending between said blocks, said member adjacent one end thereof and one of said blocks having readily detachable cooperable portions accommodating detachable connection of said member and said one block upon downward movement of said member relative to said one block, the other of said blocks including a generally upstanding flange having an upwardly open slot therein, said member at the other end thereof being receivable in the slot in said flange upon downward movement of said member relative to said flange, a movable cam surface mounted adjacent said other end of said member for engaging the outer surface of said flange adjacent said slot, and means for actuating said cam surface to secure said blocks in tight wedging engagement with the wheel.

18. A wheel chock comprising blocks for engaging under the front and rear portions of a wheel, and an elongate rigid member extending between said blocks, said member at one end thereof and one of said blocks having readily detachable cooperable portions accommodating detachable connection of said member and said one block upon downward movement of said member relative to said one block and retaining said one block against relative movement longitudinally of said member, said member at its other end and the other of said blocks having readily detachable cooperable and relatively adjustable portions accommodating connection of said other block and said member upon downward movement of said member relative to said other block and subsequent relative adjustment of said latter portions, said latter portions upon relative adjustment moving said blocks toward one another longitudinally of said member, said blocks being individually insertable under the front and rear portions of the wheel, respectively, to block the wheel, said member being separately connectable to said blocks, said latter portions of said other block and the other end of said member being adjustable to wedge said blocks into tight engagement with the front and rear portions of the wheel, at least one set of said cooperable portions including means accommodating additional relative adjustment of said blocks longitudinally of said member to accommodate ready adjustment of the chock to wheels of various diameters.

19. A wheel chock assembly for wheels of the dual tire type carrying a pair of tires disposed closely adjacent one another, comprising two opposed pairs of blocks, the blocks of each pair being spaced apart a distance substantially equal to the spacing between the tires for engaging, respectively, under the lower front and the lower rear portions of the tires, a rigid connecting element extending between the blocks of each pair and rigidly connecting the same together, and means for forcing said pairs of blocks toward each other comprising a separate rigid draw element of a length greater than the distance between the lower front and the lower rear portions of the tires, said draw element extending between said connecting elements, said connecting elements and said draw element adjacent its opposite ends including complementary portions cooperable with one another upon downward movement of the respective ends of said draw element toward said connecting elements for detachably connecting said draw element to said connecting elements, said pairs of blocks being individually engageable, respectively, with the front and rear portions of the tires and said draw element being subsequently and separately insertable between the two tires immediately above said connecting elements and being movable downwardly toward said connecting elements to effect detachable connection of the blocks and said draw element with the end portions of said draw element disposed between the blocks of the respective pairs, the two tires and the blocks of each pair guarding said draw element against accidental disassociation from said connecting elements.

20. A wheel chock comprising block means for engaging under a wheel adjacent the bottom of the wheel, said block means being movable horizontally toward and away from the wheel and including a cam surface facing outwardly and downwardly away from the wheel, a cam pivotally movable into and out of engagement with said cam surface, support means for said cam having a relatively fixed position and pivotally mounting said cam to the side of said block means opposite the wheel, and means for pivoting said cam into engagement with said cam surface for forcing said block means into wedging engagement with the wheel, said cam and said cam surface including complementary vertical and horizontal surface portions for retaining said block means in fixed position.

21. A wheel chock for dual tire wheels comprising a pair of blocks for engaging under the tires of the wheel adjacent the bottom of the wheel, an upstanding flange fixed between said blocks, said flange including a curved upper portion extending outwardly in the direction away from the wheel and defining to the side thereof opposite the wheel an outwardly and downwardly facing cam surface, a cam pivotally movable into and out of engagement with said cam surface, support means for said cam having a relatively fixed position and including a portion spaced from said cam surface to the side of said flange opposite the wheel, said cam being pivotally mounted on said portion of said support means below said curved portion of said flange, and means for pivoting said cam forwardly and upwardly into engagement with said cam surface for forcing said pair of blocks into wedging engagement with the tires of the wheel.

References Cited in the file of this patent

FOREIGN PATENTS 371,775     France _____ Feb. 1, 1907